(12) United States Patent
Pasotti et al.

(10) Patent No.: US 9,240,109 B2
(45) Date of Patent: Jan. 19, 2016

(54) LED INDICATOR FOR PRODUCING A LIGHT BAR IN A BARGRAPH

(71) Applicant: Magneti Marelli S.p.A.

(72) Inventors: Alessandro Pasotti, Milan (IT); Renato Patti, Busto Arsizio (IT)

(73) Assignee: MAGNETI MARELLI S.P.A., Corbetta (IT)

( * ) Notice: Subject to any disclaimer, the term of this patent is extended or adjusted under 35 U.S.C. 154(b) by 149 days.

(21) Appl. No.: 14/085,203

(22) Filed: Nov. 20, 2013

(65) Prior Publication Data

US 2014/0145856 A1    May 29, 2014

(30) Foreign Application Priority Data

Nov. 23, 2012    (IT) .............................. TO12A001019

(51) Int. Cl.
G08B 5/22      (2006.01)
G09F 9/33      (2006.01)
G08B 5/36      (2006.01)
B60Q 3/04      (2006.01)
B60K 37/02     (2006.01)
B60K 35/00     (2006.01)

(52) U.S. Cl.
CPC . *G08B 5/36* (2013.01); *B60K 35/00* (2013.01); *B60K 37/02* (2013.01); *B60Q 3/044* (2013.01); *B60K 2350/203* (2013.01); *B60K 2350/2039* (2013.01)

(58) Field of Classification Search
CPC ........... G08B 5/36; B60K 37/02; B60Q 3/044
USPC ....................................... 340/815.45
See application file for complete search history.

(56) References Cited

U.S. PATENT DOCUMENTS 5,815,072 A  *  9/1998  Yamanaka et al. ............ 340/461
5,949,346 A  *  9/1999  Suzuki et al. ............ 340/815.45
8,325,029 B2 * 12/2012  Brooking et al. ............. 340/468
8,646,932 B2 *  2/2014  Lee et al. ...................... 362/97.3

FOREIGN PATENT DOCUMENTS

EP      2397878 A1    12/2011
EP      2735477 B1     7/2015

OTHER PUBLICATIONS

Italian Search Report IT TO20121019 dated Jul. 19, 2013.

* cited by examiner

*Primary Examiner* — Eric Blount
(74) *Attorney, Agent, or Firm* — Howard & Howard Attorneys PLLC

(57) ABSTRACT

A led indicator has a bargraph and a lighting device arranged behind the bargraph and provided with a row of LEDs controlled to produce a light bar with a length which is variable as a function of the number of LEDs that are switched on along a lighting sense; the LEDs are arranged between screens, which are spaced apart from the lower surface of the bargraph and extend at least to reach an axis which starts from the immediately preceding led orthogonally to such a lower surface.

5 Claims, 2 Drawing Sheets

LED INDICATOR FOR PRODUCING A LIGHT BAR IN A BARGRAPH

CROSS-REFERENCE TO RELATED APPLICATION

This application is based upon and claims priority to published Italian Patent Application TO2012A 001019, filed on Nov. 23, 2012.

BACKGROUND OF THE INVENTION

1. Field of Invention

The present invention relates to a LED indicator for producing a light bar in a bargraph, in particular for an instrument on a motor vehicle.

2. Description of the Related Art

In the instrument panel of motor vehicles, as an alternative to common pointer indicators, it is known in the art to use so-called bargraphs, which are backlit by a row of LEDs to produce a light bar of variable length. The length depends on the number of adjacent LEDs that are switched on and provides visual information of a variable quantity, in particular of a measurement carried out in the motor vehicle (e.g. the measurement of speed, engine RPM, fuel consumption, etc.).

LEDs are usually housed in respective cavities, which are separated from one another by screens. In solutions known in the art, such screens extend orthogonally to the bargraph, up to the lower surface of the bargraph itself, so as to prevent any leakage of light towards the adjacent cavities where the LEDs are off. Due to this configuration, the backlighting of the bargraph produces a series of segments, which are arranged between areas turned off or with dim light due to the presence of the underlying screens. With this configuration, the reading of the measured value on the bargraph is well defined due to the absence of leakages of light from the lighted segments to the dark ones. An example of this kind of solution is shown in published U.S. Pat. No. 5,949,346A.

However, if obtaining a bar of continuous, non segmented light is desired, it would be appropriate to reduce the height and/or thickness of the screens. Further, by operating in this manner with the known solutions, there would be a leaking of light from the last cavity having a switched on led towards the dark side of the bargraph, whereby the visual indication of the measurement would not be accurately perceived by the user.

SUMMARY OF THE INVENTION

It is the object of the present invention to provide a LED indicator for producing a light bar in a bargraph which allows the above drawback to be solved in a simple and cost-effective manner when obtaining a continuous light bar is desired.

According to the present invention, a LED indicator for producing a light bar in a bargraph is provided.

BRIEF DESCRIPTION OF THE DRAWINGS

The invention will now be described with reference to the accompanying drawings, which show a non-limiting embodiment thereof, in which.

DETAILED DESCRIPTION OF THE INVENTION

Figure 1:
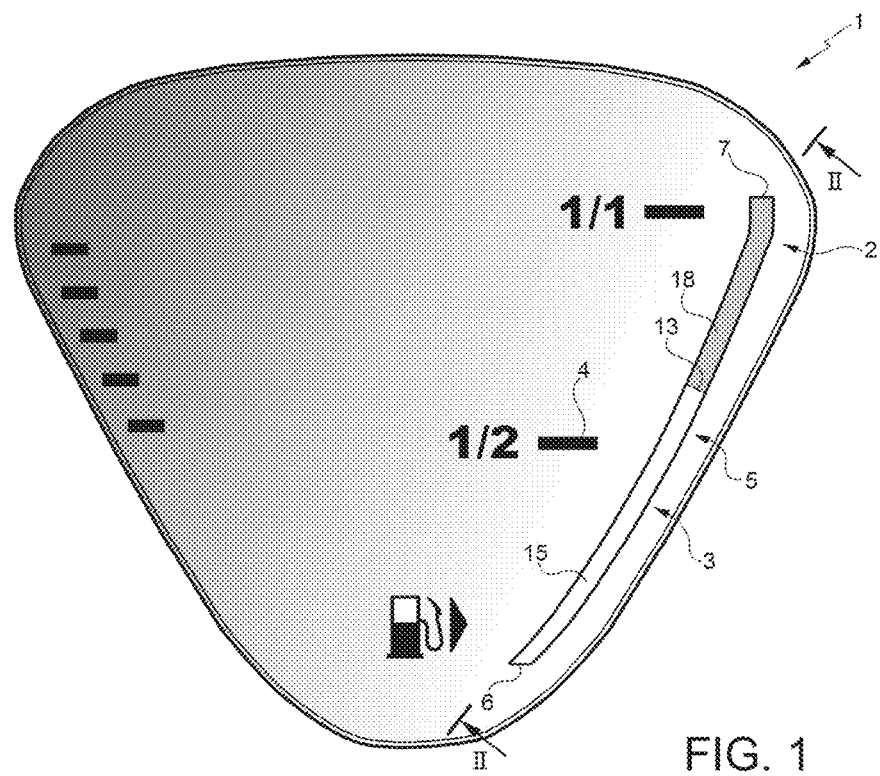
FIG. 1 shows a partial plan view of an instrument of a motor vehicle, having one embodiment of the LED indicator for producing a light bar in a bargraph according to the present invention.

In FIG. 1, reference numeral 1 indicates an instrument of a motor vehicle, which include a LED indicator 2 for providing a user with information relating to a variable quantity (for example, a measurement carried out in the motor vehicle). The example shown refers to the amount of fuel in a tank, but the LED indicator 2 may be generally used for any type of quantity.

The LED indicator 2 includes a bargraph 3, which further includes a graduated scale 4 and a window 5 made of a light-permeable material and adapted to be backlit, as will be described below. The window 5 has an elongated (either straight or curved) shape from a starting point 6 (corresponding to a minimum value of the graduated scale 4) up to a final point 7 (corresponding to a maximum value of the graduated scale 4).

Figure 2:
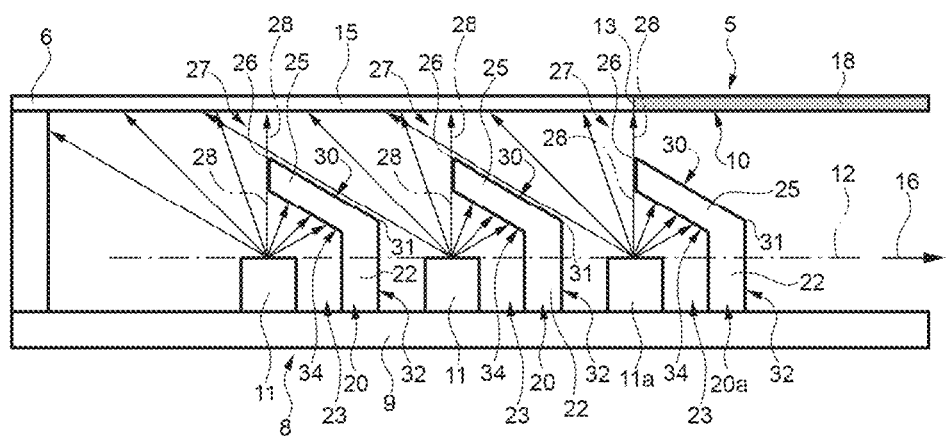
FIG. 2 diagrammatically shows the LED indicator in FIG. 1, in a section along line II-II in FIG. 1.

With reference to FIG. 2, the LED indicator further includes a lighting device 8 which further includes an electronic board 9 arranged behind the window 5 in a position spaced apart from a lower flat surface 10 of the bargraph 3. The electronic board 9 supports a plurality of LEDs 11, which are arranged in a row along a direction 12, each beneath a corresponding area of the window 5. The LEDs 11 are preferably spaced apart from one another by a constant step. The electronic board 9 has a printed circuit board controlled for powering the LEDs 11 and light the areas of the window 5 from the starting point 6, so as to produce a light bar 15 having a length which is variable as a function of the number of LEDs 11 which are switched on as a sequence in a lighting sense 16 starting from point 6 towards point 7. The end of the light bar 15 is indicated by reference numeral 13 and is lit by the LED indicated by reference numeral 11a in FIG. 2: in relation to the graduated scale 4, the end 13 provides visual information of the measured value. Thus, if only some LEDs 11 are switched on, window 5 has a dark area 18 from end 13 to the final point 7.

With reference to FIG. 2, the electronic board 9 also supports a row of screens 20, which are arranged between the LEDs 11 along direction 12 and are substantially light-impermeable. The screens 20 include respective base portions 22 which extend from the electronic board 9, transversely to direction 12. The base portions 22 are preferably flat and are orthogonal to the electronic board 9 and to direction 12. The base portions 22 are conveniently spaced apart from the LEDs 11 along direction 12 and define a series of cavities 23 therebetween, each of which is delimited at the bottom by the electronic board 9 and accommodates a corresponding LED 11.

The screens 20 include respective appendixes 25, which extend from the base portions 22, respectively, and end with an edge 26 which is spaced from the window 5 so as to leave an empty space or "gap" 27 in which light can pass. Due to the presence of the gaps 27, the areas lit by the LEDs 11 are contiguous and not separated from one another, whereby the light bar 15 is of the continuous, non segmented type.

According to the present invention, the shape of the screens 20 is such as to prevent the light emitted by the LEDs 11 from going towards the gaps 27 forward, but they allow the light emitted by the LEDs 11 to go through the gaps 27 only backwards. Herein and hereafter, the terms "forward", "backward", "previous", "next", "front", "rear", "after", "before", etc. are indicated with reference to the lighting sense 16.

The appendixes 25 extend in a cantilever fashion from the respective base portions 22 and backwards (i.e. in the sense opposite to the lighting sense 16) so as to close at the top an immediately preceding part of the cavity 23. The width or extent of each appendix 25 along direction 12 is such as to reach, with the edge 26, at least the position of an axis 28 which extends orthogonally to the window 5 from the immediately preceding LED 11.

Thereby, considering the above-mentioned LED 11a, the latter is followed by a screen 20a which covers and blocks at least the front half of the light beam emitted by LED 11a. The other part of the light beam emitted by LED 11a reaches the surface 10, but its rays cross the window 5 or are reflected back, due to their inclination with respect to the surface 10 itself. In other words, the appendix 25 of the screen 20a prevents the surface 10 from being reached by light rays inclined forward with respect to axis 28, to avoid reflections in the dark area 18 and clearly define the end 13.

In FIG. 2, the axis 28 of LED 11a touches or lies on the edge 26 of the screen 20a. However, the appendixes 25 may extend backward beyond such a position, so as to be intersected by axis 28.

Figure 3:
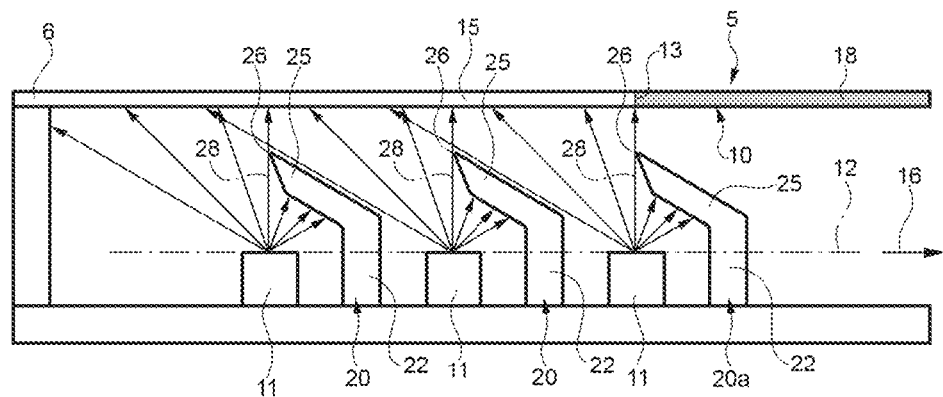
FIGS. 3 to 5 are similar to FIG. 2 and show respective variants of the LED indicator.

The edge 26 of each appendix 25 is defined by a flat surface which is relatively small and extends orthogonally to direction 12 and to the surface 10. According to the embodiment shown in FIG. 3, the edge 26 is defined by a sharp edge, which extends orthogonally to direction 12 and to axis 28.

Again with reference to FIG. 2, each appendix 25 is delimited at the top by a surface 30 facing the surface 10 and extending from edge 26 up to an edge 31, which joins the surface 30 to a lateral surface 32 of the base portion 22. In other words, the lateral surface 32 of each base portion 22 faces the immediately following LED 11. In particular, the edge 31 extends orthogonally to direction 12 and parallel to surface 10.

According to one embodiment of the present invention, the surface 30, the edge 31, and the lateral surface 32 remain below the light beam emitted by the immediately following LED 11. In this regard, the LEDs 11 are regarded as dot-like light sources (for simplicity) and each emits a respective light beam which is symmetrical and has a predetermined maximum width with respect to the optical axis of the LED 11 itself. In particular, the optical axis of each LED 11 substantially coincides with axis 28 if the direction 12 and the electronic board 9 are parallel to the surface 10. For example, LEDs are available on the market providing a light beam of conical shape having a maximum width of ±30° or ±60° with respect to the optical axis. Below such a width, the LED produces no light. By selecting the category of LEDs to be installed in the LED indicator 2, the maximum width of their light beam is known, and it is thereby possible to design the height of the surface 32 and the inclination of the surface 30 so as to prevent such surfaces from receiving the rays of the light beam emitted by the immediately following LED 11. Thus, that part of the light beam emitted by the LEDs 11a which is not blocked by screen 20a, directly reaches the surface 10 without affecting the immediately preceding screen 22. Therefore, the surfaces 30, 32 do not reflect light rays towards the window 5 and/or towards the gap 27. In other words, there are no reflected rays which can pass over the screen 20a towards the dark area 18. The lateral surface 32 preferably extends from the electronic board 9 orthogonally to direction 12. As mentioned above, it is sufficient to limit the height of the lateral surface 32 with respect to the electronic board 9 to prevent the lateral surface 32 from being hit by light rays.

Figure 4:
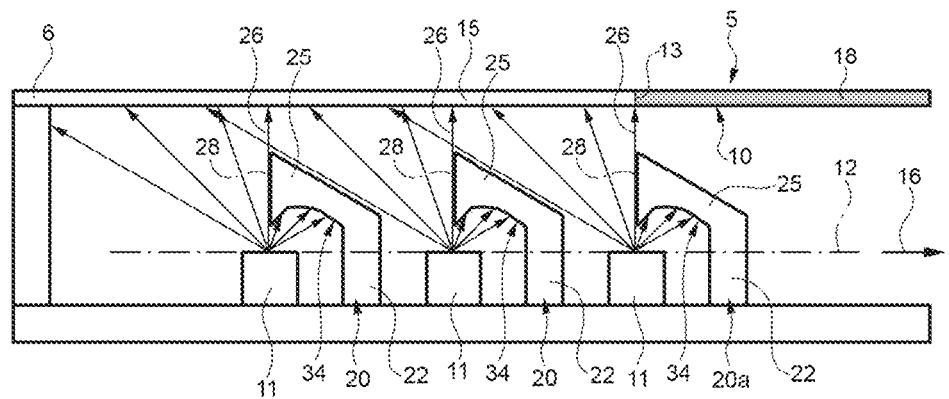
Figure 5:
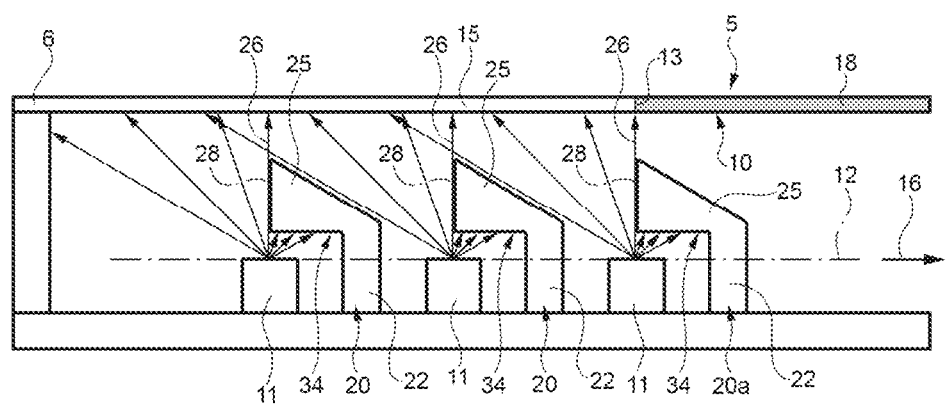

Again with reference to FIG. 2, on the lower side (i.e. on the opposite side with respect to surface 30), the appendix 25 of each screen 20 is delimited by a surface 34 facing the immediately preceding LED 11, and it is thus irradiated by such a LED 11. The surface 34 preferably has such an inclination and/or shape as to reflect the light emitted by the underlying LED 11 towards the electronic board 9 and/or towards the corresponding base portion 22, and not towards the base portion 22 of the immediately preceding screen 20. In the embodiment of FIG. 2, the surface 34 is flat and substantially has the same inclination as the surface 30. According to the variants in FIGS. 4 and 5, in order to more effectively retain the reflections of the surface 34, the latter has a concave shape or a planar shape, respectively, orthogonal to axis 28 of the immediately preceding LED 11.

It is apparent from the foregoing description that the configuration of screens 20 allows a continuous, non segmented light bar 15 to be obtained, due to gaps 27; light emissions and reflections towards the dark area 18 to be limited as much as possible, due to the extension, position, and shape of the appendixes 25. In particular, the backward extension of the appendixes 25, up to reach the immediately preceding axis 28 with the edge 26, allows the end 13 to be clearly marked. In fact, the surface 10 reflects the direct light rays from the LEDs 11 (only backwards), thus the disclosed configuration prevents reflections of light directed towards the dark area 18. Moreover, the other geometrical and dimensional features of the screens 20 contribute to preventing the reflected light rays from reaching the dark area 18 through the gaps 27. Further, the LED indicator 2 may be implemented in a relatively simple manner, only changing the shape and size of the screens 20 as compared to solutions known in the art.

Finally, it is apparent that the LED indicator 2 described with reference to the accompanying drawings may be subject to modifications and variants which do not depart from the scope of protection of the present invention as defined in the appended claims. In particular, the shape of the appendixes 25 and/or the base portions 22 may be different from those indicated by way of example; and/or the LED indicator 2, instead of forming part of an instrument on board of a motor vehicle, may form part of any measuring instrument or of an electronic device (such as a satellite navigation system, a car radio, etc.) where providing a visual indication about a quantity is needed.

What is claimed is:

1. A LED indicator comprising:
   a bargraph, having a light-permeable elongated window;
   a lighting device, facing a flat surface of said window, and including:
   a plurality of LEDs, which are arranged in a row along a longitudinal direction behind said elongated window and, in use, are controlled so as to be switched on in sequence in a lighting sense from a starting point towards a final point, for forming, in said window, a light bar having a length which is variable as a function of the number of LEDs switched on from said starting point;
   a plurality of light-impermeable screens arranged between said LEDs along said longitudinal direction;
   wherein said screens comprise respective base portions and respective appendixes; each of said appendixes extending from the corresponding base portion and ending with an edge, which is spaced apart from said flat surface so as to leave a gap in which light can pass; each of said appendixes extending longitudinally towards said starting point at least to reach a lighting axis, which extends in direction orthogonal to said flat surface from the immediately preceding LED.

2. A LED indicator as set forth in claim 1, wherein said edge is orthogonal to said longitudinal direction.

3. A LED indicator as set forth in claim 2, wherein said edge is defined by a sharp edge.

4. A LED indicator as set forth in claim 1, wherein said base portions are transversal to said longitudinal direction; each of said appendixes extending in cantilever fashion from the respective base portion and underneath the light beam emitted, in use, by the immediately following LED.

5. A LED indicator as set forth in claim 1, wherein said portions are transversal to said longitudinal direction; each of said appendixes extending in cantilever fashion from the respective base portion and having a lower portion, which faces the immediately preceding LED and is shaped so as to reflect the light rays coming from the immediately preceding LED towards at least one of an electronic board supporting said LEDs and the respective base portion.

* * * * *